United States Patent [19]
Plester et al.

[11] Patent Number: 5,776,333
[45] Date of Patent: Jul. 7, 1998

[54] ON PREMISE WATER TREATMENT APPARATUS

[75] Inventors: George Plester; Stijn Vandekerckhove, both of Brussels, Belgium

[73] Assignee: The Coca-Cola Company, Atlanta, Ga.

[21] Appl. No.: 414,954

[22] Filed: Mar. 31, 1995

[51] Int. Cl.⁶ .................. B01D 17/12; B01D 35/01; B67D 5/56
[52] U.S. Cl. .............. 210/104; 210/109; 210/180; 210/257.1; 210/299; 210/472; 222/129.1; 222/189.09
[58] Field of Search .................. 210/86, 90, 97, 210/103, 104, 109, 110, 138, 149, 180, 182, 184, 185, 186, 188, 257.1, 257.2, 258, 295, 299, 305, 320, 718, 120, 436, 472; 222/129.1, 146.1, 146.2, 146.6, 189.06, 189.09, 189.11; 137/572

[56] References Cited

U.S. PATENT DOCUMENTS

| | | | |
|---|---|---|---|
| 314,150 | 3/1885 | Roeske . | |
| 661,189 | 11/1900 | Olsen et al. . | |
| 2,347,927 | 5/1944 | Paterson . | |
| 2,595,913 | 5/1952 | Baily | 210/436 |
| 3,831,757 | 8/1974 | Gossett | 210/143 |
| 3,873,445 | 3/1975 | Bussard | 210/149 |
| 3,974,075 | 8/1976 | Saigh et al. | 210/86 |
| 4,066,550 | 1/1978 | Beaumont | 210/183 |
| 4,120,787 | 10/1978 | Yargeau . | |
| 4,483,769 | 11/1984 | Sherman | 210/282 |
| 4,588,500 | 5/1986 | Sprenger et al. | 210/100 |
| 4,606,823 | 8/1986 | Lucas, III | 210/282 |
| 4,759,474 | 7/1988 | Regunathan et al. | 210/189 |
| 4,761,295 | 8/1988 | Casey | 222/189.06 |
| 4,844,796 | 7/1989 | Plester | 210/100 |
| 4,892,653 | 1/1990 | Latge | 210/184 |
| 4,948,499 | 8/1990 | Peranio | 210/180 |
| 4,957,624 | 9/1990 | Peranio | 210/180 |
| 5,017,284 | 5/1991 | Miler et al. | 210/97 |
| 5,160,444 | 11/1992 | McFarland | 210/120 |
| 5,215,655 | 6/1993 | Mittermaier | 210/234 |
| 5,254,243 | 10/1993 | Carr et al. | 210/94 |
| 5,256,279 | 10/1993 | Voznick et al. | 210/257.2 |
| 5,443,739 | 8/1995 | Vogel et al. | 210/652 |

FOREIGN PATENT DOCUMENTS

4028529  3/1991  European Pat. Off. .

*Primary Examiner*—Joseph W. Drodge
*Attorney, Agent, or Firm*—Birch, Stewart, Kolasch & Birch, LLP

[57] ABSTRACT

A water treatment apparatus uses a removable, disposable cartridge having an internal mesh structure. A permanent heater heats water fed to the cartridge. Precipitated solids collect on the mesh surface provided temperature and residence time are appropriately maintained. The heat breaks down the bicarbonate hardness of the water thereby depositing carbonates on the mesh surface and heavy metals will be codeposited due to the resultant change in pH. The cartridge has a head-space for collecting entrained gasses such as volatile organic compounds, chlorine and air. Water sterility is achieved by heating the water over an appropriate period of time. Turbidity is removed within the cartridge due to settling induced by the low fluid velocity controlled by a controller and by a filter provided at the outlet of the cartridge. The filter will become blocked when bicarbonate hardness is carried over forcing a user to replace a spent cartridge. Heat economy and a cool treated water outlet stream are secured by use of a heat exchanger. Water is fed from the cartridge, through the heat exchanger to a storage tank. Water in the storage tank is kept out of contact with air by a movable barrier. Eventually, the water is fed from the storage tank to a dispenser and can subsequently be used in a post-mix beverage dispenser.

24 Claims, 3 Drawing Sheets

ON PREMISE WATER TREATMENT APPARATUS

BACKGROUND OF THE INVENTION

1. Filter of the Invention

The present invention relates to a water treatment apparatus for use in a post-mix beverage dispenser.

2. Description of the Background Art

In some locations, water sterility is a health issue, and restricts the use of on premise beverage preparation machines (generally referred to as "post-mix" equipment). Where water is to be used in beverage preparation, excessive bicarbonate hardness is undesirable, since it reduces the acidity of the beverage and affects taste. Volatiles in water, such as organics and chlorine also can have an affect on its taste. Particularly hologenated organics (tri-halomethanes, generally described as THMs) have recently given rise to consumer concerns and regulatory restriction. Suspended matter and turbidity reduces the quality of water both when consumed alone, and on mixing to produce a beverage. Finally, in certain locations, consumers have also shown concerns regarding the heavy metal content of water, and this too has been the subject of legislation in some countries.

Dissolved air in raw water, although not in itself a water quality aspect, can reduce the effectiveness of carbonation in post-mix equipment, and make dispensing difficult due to foaming. A means of deaerating water is advantageous for such equipment. It is noted that water deaeration is always carried out prior to carbonation in bottling and canning plants.

Therefore, a simple method for in-house, or in-store, removal of microbiological contamination, bicarbonate hardness, volatile organic compounds (VOCs) —particularly THMs—as well as chlorine and heavy metals, is important for meeting certain consumer concerns, raising the quality of drinking water in some locations, and improving the taste of on premise prepared beverages in certain outlets. Additionally, deaeration of water is highly desirable for post-mix outlets, and can lead to reduced foam on dispensing and better beverage quality. However, on premise water treatment systems must meet the following criteria:

Low cost of original equipment;

High reliability in absence of technical monitoring or controls;

All the above-stated quality criteria (i.e. sterility, bicarbonate hardness, chlorine, THMs/VOCs, turbidity, heavy metals and desirably, deaeration);

Simple, convenient, safe operation by non-qualified people (i.e. in-store or in-home);

Low cost of maintenance and operation; and

Low space-utilization.

Currently available systems for use in-home and/or in-store do not meet all the quality and other criteria.

Such systems include carbon filtration systems. These systems only address chlorine and VoCs/THMs, but organics are effectively removed only when the filter is regularly maintained. When maintenance is poor, such devices can actually act as biological contaminators. Thus, carbon filtration systems can cause problems in one area while inadequately addressing other areas.

Another conventional system uses reverse osmosis. Such a system addresses bicarbonate hardness, heavy metals and microbiological contaminants only. Reverse osmosis systems require significant maintenance. Moreover, VOCs/THMs are not treated and these together with chlorine, can actually damage the reverse osmotic membrane and reduce its effectiveness.

Simple ion-exchange systems are also known. These systems normally address only bicarbonate hardness or, if more complicated, the total metal and salt content of water. However, these systems need regular maintenance such as the regeneration of the ion-exchange resin. If such maintenance is not carried out, these systems can actually produce treated water of worse quality than untreated water. Chlorine is untreated and can damage the ion-exchange resins in these systems. Moreover, VOCs/THMs are untreated and microbiological contaminants are not only untreated but may actually be significantly increased due to microbiological growth on the resin.

Simple filtration has been used where turbidity is a water quality issue. Such filtration addresses this criteria only, and can increase microbiological contamination if not regularly maintained.

Water sterilization systems using chemicals are known. Such systems address only the microbiological contaminant criterion and need careful maintenance to ensure that chemicals cannot pass into the treated water.

None of these above-mentioned conventional systems are easily maintained by the non-expert user. Moreover, all of these systems have significant penalties if the user fails to carry out proper maintenance. Although none of the above-mentioned systems meet the whole set of quality criteria discussed, all but the simplest and least reliable are costly both to buy and maintain.

U.S. Pat. No. 4,844,796 to Plester teaches the principles of heat treating water. This systems, however, includes carbon and sand filtration in a first cartridge section and further filtration and an activated carbon screen in a second cartridge section. It is desired to avoid such filtration and to expand the water treatment quality criteria.

SUMMARY OF THE INVENTION

Accordingly, it is a primary object of the present invention to provide an improved apparatus for treating all the water quality criteria named (i.e. microbiological contamination, bicarbonate hardness, VOCs/THMs, chlorine, turbidity and heavy metals).

It is a further object of the present invention to provide an apparatus which is simple, cheap, compact, involves low and non-expert maintenance and has no water quality risk if the user does not properly maintain the system.

In this regard, it is a further object of the present invention to provide an apparatus wherein the user is forced to take steps to maintain the system.

A further object of the present invention is to provide an apparatus which remains hot until treatment is completed to thereby avoid microbiological recontamination.

These and other objects of the present invention are fulfilled by a water treatment apparatus for use in a post-mix beverage dispenser comprising a housing defining a water treatment chamber, an inlet and an outlet. The inlet is connected to the housing for introducing water into the water treatment chamber and the outlet is connected to the housing for accommodating flow of treated water from the water treatment chamber. Control means for controlling treatment time of water in the water treatment chamber is provided. A storage tank is connected to the water outlet for receiving water from the housing and a collapsible water chamber is provided in the storage tank. The collapsible water chamber is formed, in part, by a movable hermetic barrier which contacts water stored in the water chamber. The barrier follows changes in water volume for keeping the water in the storage tank out of contact with head-space gases therein.

A water treatment apparatus for fulfilling these and other objects of the present invention also comprises a housing defining a water treatment chamber with an inlet and outlet. The inlet is connected to the housing for introducing water into the water treatment chamber and the outlet is connect to the housing for accommodating flow of treated water from the water treatment chamber. Heater means are also provided for heating water within the water treatment chamber, one of whose resulting effects is to breakdown and precipitate certain solids from the water. Collector means are disposed within the water treatment chamber. Water flows through the collector means as the water moves between the inlet and the outlet so that the collector means can collect the certain precipitated solids. Filter means are disposed within the water treatment chamber through which water is flowable downstream from the collector means. The filter means receive some of the certain precipitated solids and become blocked when the collector means are in need of maintenance. Even when the filter means are blocked, the collector means are sufficiently open to permit flow of water therethrough; however the blocked filter means prevent this flow of water through the collector means thereby signalling the need for maintenance of the collector means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
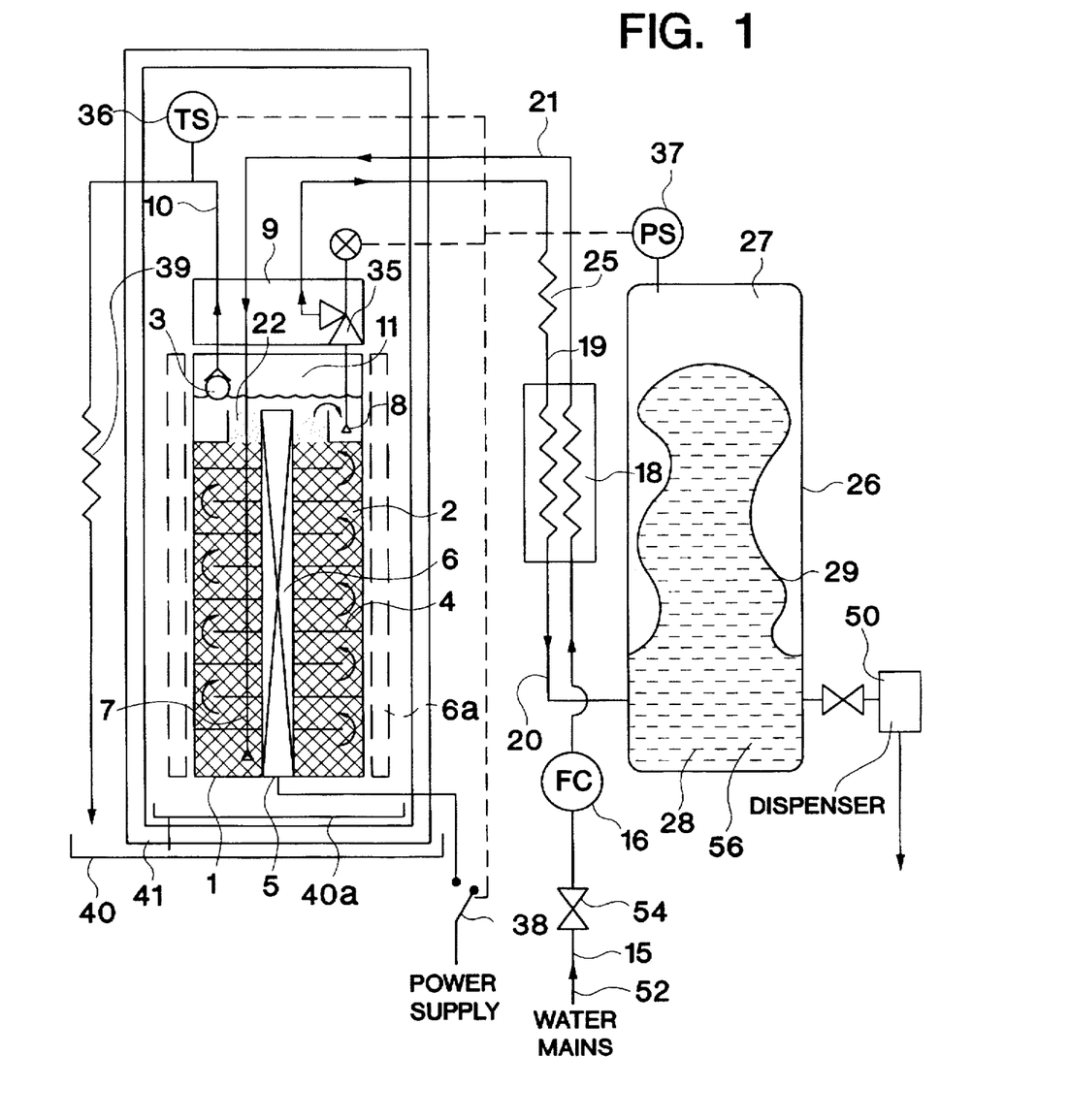
FIG. 1 shows the basic apparatus of the present invention.

Referring in detail to the drawings and with particular reference to FIG. 1, the apparatus of the present invention is shown. This apparatus includes a removable/disposable housing or cartridge 1 having a mesh structure 2 and a float valve 3. The interior of cartridge 1 forms a water treatment chamber. The mesh structure 2 can be metal or plastic. The mesh structure 2 acts as a collector means through which water flows as will be described below.

Optional baffles 4 may be provided in the mesh structure 2 in cartridge 1. These baffles 4 guide the water along a tortuous path from one end of the cartridge 1 to another as indicated by the arrows. The baffles 4 can be either metal or plastic and will ensure good distribution, avoidance of short-circuiting and good particle settling.

Figures 4, 5:
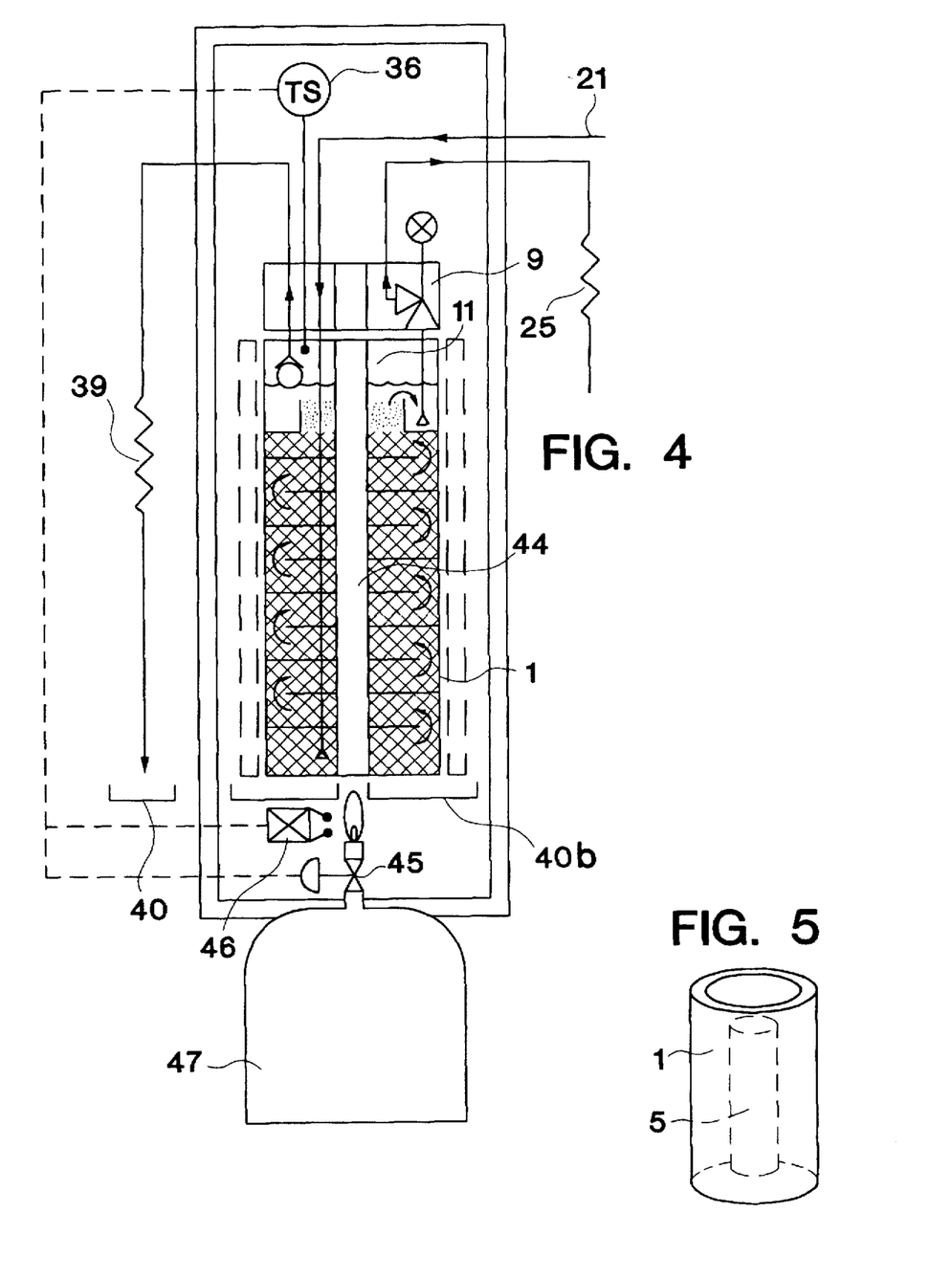
FIG. 4 shows an alternative gas heating system of the present invention.
FIG. 5 shows a reduced scale, perspective view of a cartridge used in the present invention.

In FIG. 5, the toroidal shape of cartridge 1 can be seen. In other words, the cartridge 1 has a cylindrical shape with a longitudinal cavity 5. This cavity 5 is shown as terminating within the cartridge 1, but this cavity 5 could extend completely through the cartridge 1.

As FIG. 1 shows, cartridge 1 is heated by an internal heater 6 or an external heating-mantle 6a (as indicated in dotted lines). The internal heater 6 is inserted into the centrally located cavity 5. While cartridge 1 is disposable, the internal heater 6 or heating-mantle 6a act as a permanent heating means. The cartridge 1 is insertable on or into either of these heaters and is readily removable therefrom. It is contemplated that only one heater 6 or heating-mantle 6a will be used; however, both heaters can be used, if necessary. The external heating-mantle 6a can surround all of the generally cylindrical cartridge 1 or only a part of this cartridge. Of course, other heating arrangements should be readily apparent to those skilled in the art.

Internal pipes are arranged within the cartridge 1. These pipes includes inlet pipe 7 which ducts incoming untreated water to the base of cartridge 1. An outlet pipe 8 ducts the treated water from the top of the cartridge 1. These pipes 7 and 8 can respectively be considered as a water inlet and a water outlet to the water treatment chamber in cartridge 1.

The cartridge 1 is located within the apparatus by a removable head 9. Cartridge 1 can be screwed onto head 9 or attached thereto by any other suitable means. This head 9 and cartridge 1 merely need to be connected such that water will not leak from cartridge 1. Suitable gaskets or O-rings can be used to ensure an hermetic seal between head 9 and cartridge 1, if so desired.

The head 9 contains the inlet/outlet water piping and a vent 10 for the gases as will be explained below. Vent 10 can simply be a pipe extending from the interior of the cartridge 1. The cartridge 1 is readily removable from an insulating mantle 41. This mantle 41 can easily be opened to provide access for changing cartridge 1.

Head 9 is removable from cartridge 1. The head 9 can be extracted from mantle 41 with the cartridge 1 or alternatively, can be separated from the cartridge 1 and remain within this mantle 41. Appropriate couplings (such as quick release couplings) are provided for the pipes 7, 8 and vent 10 so that these elements can readily be connected or disconnected to existing piping structure within the cartridge 1. Alternatively, these pipes 7, 8 and vent 10 can simply be inserted into the cartridge 1 when head 9 is placed on the mantle 41. One skilled in the art should appreciated many different arrangements whereby the cartridge 1 can be readily inserted into and removed from mantle 41.

Untreated raw water indicated by numeral 15 enters the system through water main 52. This water passes through valve 54 and a mechanical flow control 16. Valve 54 can be omitted and control means 16 can act as the sole inlet control between the water main 52 and cartridge 1.

The control means 16 controls flow of the water through the cartridge 1. The control means or flow control 16 will control the velocity of the water through the cartridge 1 such that the water will remain in the cartridge for a predetermined period of time, usually 10–60 minutes.

The water in inlet pipe 7 travels through a heat exchanger 18. The raw water 15 is heated by outgoing treated water indicated by numeral 19. This will reduce the temperature of product water 20 close to the temperature of the incoming raw water 15.

The heated raw water 21 will enter cartridge 1 and be ducted to the base of the cartridge by the inlet pipe 7. This water will then rise through the cartridge 1 being heated by the internal heater 6 or the external heating-mantle 6a. The water will rise to the level of the float valve 3 and will be ducted out of the cartridge 1 by the outlet pipe 8.

Gasses disentrained within the cartridge 1 consists mainly of whatever VOCs/THMs, air and chlorine are dissolved in the raw water as well as carbon dioxide formed during the heat induced decomposition of bicarbonate. In particular, volatiles will be removed due to the rise in temperature and attendant reduction in solubility of the water. These volatiles will also be removed by the stripping effect of dissolved air and nascent carbon dioxide generated by the breakdown of bicarbonate hardness.

Gasses collect in the head-space 11 of the cartridge 1 and are released periodically together with steam by float valve 3. These gasses are then vented through vent 10. Solids contained in the raw water 15, or formed by the decomposition of bicarbonates, or heavy metals whose solubility has been reduced, are deposited in the mesh structure 2 of cartridge 1. The bicarbonates, heavy metals and any other precipitates from the water can be considered as certain precipitated solids which are collected by the mesh structure (collector means) 2.

In particular, precipitated solids collect on the surface of the mesh structure 2 provided the process criteria (temperature and residence time) are appropriately maintained. The heat from internal heater 6 or heating-mantle 6a will break down the bicarbonate hardness, depositing carbonates on the mesh structure 2. Accordingly, the cartridge 1 is a reaction chamber in which bicarbonate is removed out of solution in the water by thermal decomposition, which changes the bicarbonate to carbonate and carbon dioxide. The carbonate is insoluble and deposits as a hard "fur" (clinging sediment) on the mesh structure 2 and other hot surfaces within the disposable cartridge 1.

As will be explained below, these deposits eventually reduce the internal capacity of the cartridge 1 to a point beyond which the thermal decomposition can no longer be completed because the reduced space in the cartridge results in a reduction in the treatment time available for the water in the cartridge. In other words, carbonates and heavy metals are codeposited and gradually fill up the cartridge 1 reducing its void space and thus reducing residence time of the water in the cartridge. The heavy metals are codeposited with the carbonates due to the resultant change in pH of the water. As the residence time is reduced, so is the time available for the precipitation to take place. At some point, when the deposits have reached a certain level and the voidage within the cartridge has been reduced to a certain degree, there is no longer sufficient space in the cartridge 1 to achieve minimum residence time needed to complete the precipitation process. Then water with precipitatable dissolved solids will enter a polishing ring filter 22. This ring filter 22 will be described in more detail below.

As set forth above, the cartridge 1 has a free internal gas/liquid surface at head-space 11 where volatiles are collected and discharged by the internally operated valving device 3. The volatiles (VOCs/THMs and chlorine) are removed due to the rise in temperature and attendant reduction in solubility and also by the stripping effect of dissolved air and of nascent carbon dioxide generated by the breakdown of bicarbonate hardness. Water sterility is achieved by heating the water over an appropriate time period. Turbidity is removed within the cartridge 1 due to settling induced by the low fluid velocity controlled by the control means 16 and by the fine filtration mesh or filter 22.

The ring filter 22 is a filter means. The water at the top of the cartridge is ducted through this ring filter 22 which acts as a polishing filter. Cotton-wool fine sand and/or plastic granules, porous plastic or similar material can be used for filter 22. Any material suitable for fine, depth-filtration can be used for ring filter 22. The filter 22 will initially have a function of removing or polishing minute carry-over of solids in solid (i.e. non-dissolved) form. The filter 22 is arranged to be in contact with either the internal heater 6 or alternatively, the heating-mantle 6a. The water leaving the filter 22 will eventually enter the outlet pipe 8 and leave cartridge 1.

Bicarbonate escaping the mesh structure 2 (due to inadequate decomposition in cartridge 1) will deposit on filter 22. Until water with precipitatable dissolved solids enters the ring filter 22, this filter generally only removes odd specks of escaping solid. In other words, carry-over of dissolved solids should not normally reach filter 22, since such dissolved solids should be deposited on mesh structure 2; however, when the voidage within the mesh structure 2 is reduced and the cartridge 1 is spent, precipitatable dissolved solids will carry-over to ring filter 22. Since the ring filter 22 contacts the internal heater 6 and/or the heating-mantle 6a, it will be heated and the non-completed precipitation will continue or be completed in the filter 22. Carry-over off dissolved solids would normally pass through filter 22 and not affect it. Because ring filter 22 is heated, however, a post-reaction is induced and the non-completed precipitation will continue or be completed.

Because the filter 22 has minute pores compared to the mesh structure 2, the filter 22 fills and blocks very quickly due to the carry-over. These deposits will signal the need to change cartridge 1. Such bicarbonates will decompose and block ring filter 22 rendering the cartridge unusable. The user will then be forced to exchange the cartridge for a fresh one.

Water would continue to pass through the mesh structure 2 except that the blocked filter 22 prevents such flow. In other words, if the filter 22 were not present, water would continue to flow through the mesh structure 2 and exit the cartridge. While some purification of the water would occur, the water exiting the cartridge 1 would not be adequately treated. Because filter 22 is present, water flow will terminate when this filter becomes blocked due to bicarbonates being carried over. The condition of the filter 22 will change as a function of the depositing of bicarbonates thereon. This condition of filter 22 can be monitored. When the filter 22 is eventually blocked, the user will therefore be automatically signaled of the need for maintenance of the mesh structure (collector means) 2. When the filter 22 is blocked, the cartridge 1 is basically spent and the cartridge outlet blocked. The user will therefore be forced to replace cartridge 1.

Water sterility is achieved with the present apparatus by heating the water over an appropriate period of time under the control of control means 16. Turbidity is removed from the water within the cartridge 1 due to the settling induced by the low fluid velocity and by the filter 22 provided at the outlet of the cartridge.

Outgoing treated water 19 passes into an air-cooler 25. This air-cooler 25 has a conventional fin-type construction for air cooling. Temperature of the treated water 19 is reduced by 5° C. to 20° C. This ensures that the outgoing treated water 19 no longer has a temperature which can cause bicarbonate decomposition and solid deposition within the heat exchanger 18. Such bicarbonate decomposition and solid deposition could render the heat exchanger 18 inoperative. Also, the air-cooler 25 will ensure that incoming raw water cannot be heated within the heat exchanger 18 to a temperature which would induce premature precipitation of dissolved solids in the incoming raw water, and thus lead to ultimate blockage inside the heat exchanger 18.

The heated raw water 21 leaving the heat exchanger 18 has a temperature which is 5° C. to 20° C. lower than the operating temperature of the cartridge 1. This water will quickly reach the correct operating temperature upon entering cartridge 1. A cool treated water outlet stream is secured with the present apparatus and method. The heat exchanger also aids heat economy such that a thermally efficient system is obtained. Also, by reducing the temperature of the treated water, overheating of a downstream dispenser having built-in refrigeration can be avoided.

The operating temperature in cartridge 1 is in the range of 90° C. to 110° C., but may be significantly higher when the water contains a high proportion of sodium or potassium bicarbonates. The temperature is kept as low as practical, within the needs of treatment quality. This will enable the system to operate at a low pressure and to minimize energy consumption.

Preferably, the water will be fed by pressure from water main 52 without the necessity of a water feed pump. Of course, such a pump could be used. The residence time of the water in the cartridge 1 is controlled by the control means 16 and the design of the free volume of the cartridge 1. If a water pump is used, the control means 16 can cause this pump to supply water to the cartridge when appropriate. Residence times of water within the cartridge 1 are in the order of 10–60 minutes as noted above.

The product water 20 enters storage tank 26 from the heat exchanger 18. An air cushion 27 is provided within the storage tank 26. Head-space gases such as air are found in this cushion 27. This air cushion is separated from the stored water 28 by a movable hermetic barrier 29. Barrier 29 contacts the water in water chamber 56 and follows changes in water volume. This barrier 29 will therefore keep the water in the storage tank out of contact with head-space gases. A gaseous head-space will not be permitted to be form above and in contact with the water. The barrier 29 will permit water storage without recontamination of the water with atmosphere.

This movable barrier 29 can be a flexible membrane, a floating platform on the surface of the water in tank 26 or any other suitable structure. If a flexible membrane is used as the barrier 29, it can be made from plastic, rubber or any suitable material. The air cushion 27 is trapped in the head-space of the storage tank 26. Pressure of the air cushion 27 therefore increases as the quantity of stored water 28 increases.

In very small installations, where control simplification is desired, the controls described below can be simplified by allowing the pressure of the air cushion 27 to stop the water flow once this pressure has reached equilibrium with the water main pressure. In such an arrangement, the flow would automatically restart when stored water 28 is withdrawn and the pressure of the air cushion 27 falls. In such a case, cartridge 1 must be oversized in capacity to deal with the condition of cold starting.

Figure 2:
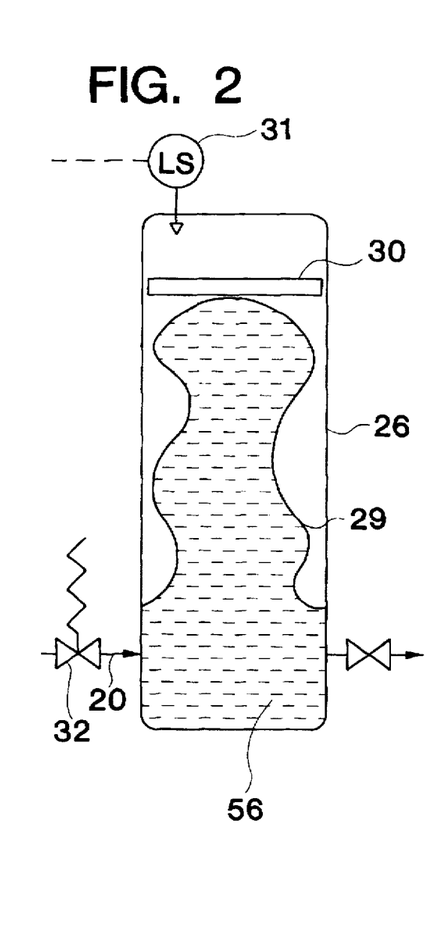
FIG. 2 shows an alternative arrangement for the product water storage tank of the present invention.

Alternatively, as shown in FIG. 2, instead of an air cushion 27, the barrier 29 can move a actuator 30. This actuator 30 can be a vertically movable platform within the storage tank 26. Upon reaching a certain height, the actuator 30 will trigger a level switch 31. The level switch 31 is part of the control system of the apparatus described below. When it is necessary to operate with cartridge 1 having a temperature above 100° C., a back pressure on the cartridge 1 can be provided by a simple, conventional spring-relief valve 32.

The purpose of barrier 29 is to permit water storage without recontamination of the water as noted above. The water is out of contact with the ambient environment. Air within the storage tank (such as air cushion 27) is kept out of contact with the stored water 28. The barrier can also prevent the formation of a gaseous head-space in contact with the water in chamber 56.

The purpose of the storage tank 26 is to enable the sizing of cartridge 1 and its heaters (6 or 6a) to be minimal and compact, by not needing to meet pre-draw requirements. One purpose of the air cushion 27 is to provide a back pressure on the cartridge 1. This will enable operating temperatures in the cartridge above 1000C. similarly to the spring-relief valve 32.

In case of electrical heating as shown in FIG. 1, heaters 6 or 6a can be sized to provide fixed heat generation consisting of required sensible heat, plus a small amount of evaporation, plus heat losses. Solenoid-operated stop valve 35 is located in the removable head 9. This stop valve 35 is closed whenever cartridge 1 is below the correct temperature of water treatment. In such a condition, no steam will be generated in its head-space. Such steam is detected by thermal switch 36 located immediately after head 9.

When thermal switch 36 detects steam, the stop valve 35 opens to permit treated water to flow from cartridge 1. When storage tank 26 is full, the air cushion 27 reaches maximum pressure. This can be detected by pressure switch 37 or level switch 31. Either switch can close a stop valve 35 and turn off the heater 6 or 6a.

As the stored water 28 is withdrawn from the storage tank 26, the pressure on the air cushion 27 falls. The heater 6 or 6a will then be switched back on. However, stop valve 35 does not immediately open. This valve 35 is kept closed by thermal switch 36 until steam is generated and the correct treatment temperature is established. The effluent gasses ducted in pipe 10 of FIG. 1 contain mainly steam. These gases are condensed in a finned coiled tube 39. The condensate collects in drip tray 40. In the embodiment shown in FIG. 2, the air cushion 27 is replaced by an actuator 30 and the level switch 31 performs all the functions described for the pressure switch 37.

Figure 3:
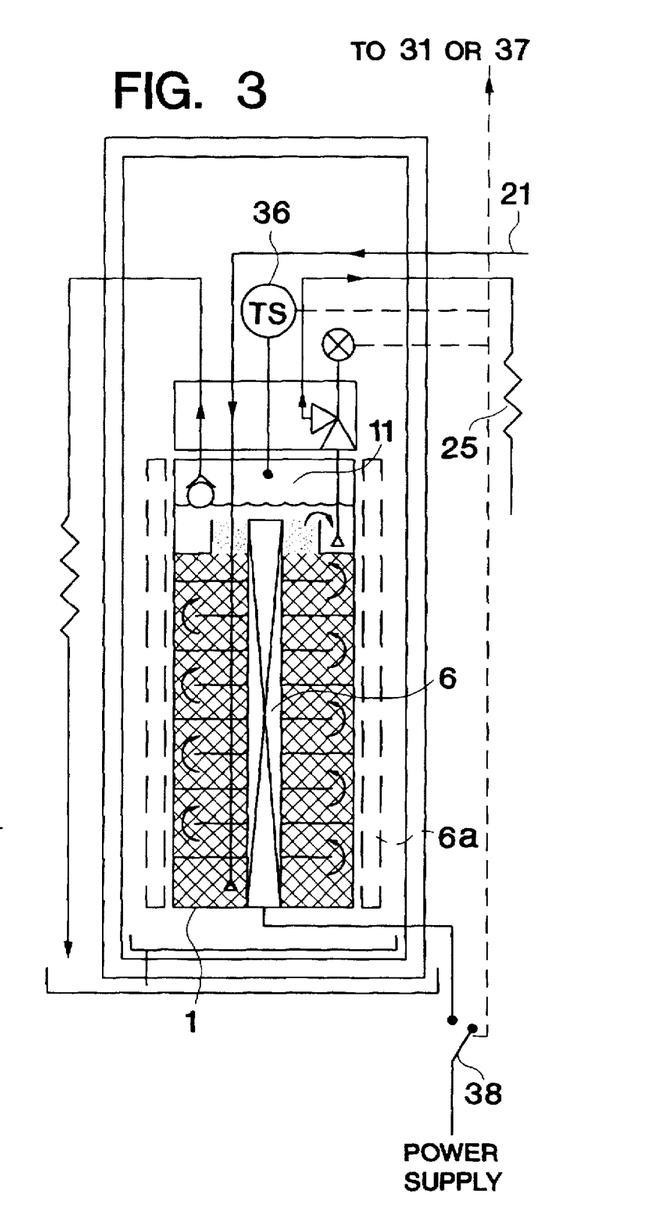
FIG. 3 shows an alternative control system using electrical heating.

Turning now to FIG. 3, a simple on/off thermostat system can instead be used. Because many of the elements in the embodiment of FIG. 3 are the same as those of FIG. 1, their description will now be omitted. The on/off thermostat system of FIG. 3 is used when the heat capacity of the heater 6 or 6a is low enough to permit good temperature control. In this case, the thermal switch 36 is located within the head-space 11 of cartridge 1. This thermal switch 36 will switch heater 6 or 6a on and off by an electrical switch 38.

FIG. 1 indicates a dispenser 50 connected to the stored water 28 in storage tank 26. It should be noted that water flows directly from the cartridge 1 to the storage tank 26 and then to the this dispenser 50 without the need for additional treatment. In particular, there is no chemical treatment of the water after it leaves the cartridge 1. Moreover, chemicals are not added to the cartridge to treat the water therein. Conventional carbon/sand filtration is avoided in the present apparatus while increased water treatment quality criteria are met.

The dispenser 50 indicated in FIG. 1 is merely shown as a block diagram. It should be clear to one of ordinary skill in the art that various dispensing arrangements may be incorporated as such a dispenser. Treated water released from this dispenser 50 can be used in a post-mix beverage dispenser. In fact, household or in-store users can tap the water from the storage tank 26 and drink it as treated water without the water going to dispenser 50. This treated water could therefore be used for domestic drinking or cooking purposes.

Turning now to FIG. 4, an alternate heating arrangement is shown. Because many of the elements in the embodiment of FIG. 4 are the same as those of FIG. 1, their description will now be omitted. Gas heating is used in this embodiment of FIG. 4 instead of internal heater 6. An external heating-mantle 6a may or may not be used depending upon the heating requirements of the apparatus.

Cartridge 1 and head 9 have an internal chimney 44 in the embodiment of FIG. 4. Thermal switch 36 is located in the head-space 11 of cartridge 1. This thermal switch 36 will switch gas valve 45 on and off. The gas flame will then be lit by spark plug 46 and ignition will be controlled in a conventional manner to ensure safe operation. The gas supply for the flame can be provided by a gas cylinder 47. The gas cylinder 47 is located beneath the internal chimney 44. The gas cylinder 47 and gas valve 45 are a part of the heater means of the FIG. 4 embodiment.

The arrangement of FIG. 4 is easily portable and can be used in many different applications. For example, this arrangement can be used at fairs, picnics or other locations where electrical power is not readily available. If an external heating mantle 6a is also provided, this FIG. 4 embodiment can also readily be used when electrical power is available and gas heating is not desired.

Apart from the water treatment apparatus of the present invention, a water treatment method is provided. In this water treatment method, water is introduced into the cartridge 1 and passed through the mesh structure 2. The water is heated by either the internal heater 6, by the external heating-mantle 6a or by a flame from gas cylinder 47. This heating will cause breakdown of bicarbonate hardness of the water. A collector or mesh structure 2 is provided on which the bicarbonate and other precipitates can be deposited. Gasses disentrained from the water are collected in head-space 11. Storage tank 26 is provided to receive the water from the outlet of the cartridge 1. This water is kept out of contact with air or other gases in a head-space of the storage tank 26 by providing a collapsible water chamber 56 including hermetic barrier 29. This barrier 29 contacts the water in the storage tank 26 and follows changes in water volume in the water chamber 56.

The method of the invention further includes the steps of introducing water into the housing or cartridge 1. A collector or mesh structure 2 and head-space 11 are provided in the housing. The water is heated by either the internal heater 6, by the external heating-mantle 6a or by a flame from gas cylinder 47. This heating will cause breakdown of the bicarbonates in the water which will be deposited on the mesh structure or collector 2. Heavy metals will be codeposited on this mesh structure 2 due to the resultant change in pH of the water. Gasses disentrained from the water are collected in head-space 11. The water is maintained in the cartridge 1 for a predetermined period of time. The water is heated during at least this predetermined period of time, usually 10–60 minutes. The water will then be supplied from housing or cartridge 1 directly to storage tank 26. The water in the storage tank 26 is kept out of contact with air or other gases in the head-space of tank 26 by the barrier 29. This barrier 29 is in contact with the water and follows changes of water volume in the water chamber 56 of the tank 26.

The water in storage tank 26 can be discharged through dispenser 50. There is no chemical treatment of the water from the cartridge 1 to the storage tank 26 and the dispenser 50. Treatment of water quality is substantially completed when the water leaves cartridge 1.

Apart from the above-described methods, the present invention also provides for a method for treating water for use in a post-mix beverage dispenser wherein the ability of the system to treat the water can be monitored. In this method, water is also introduced into housing or cartridge 1. The water will move through the housing by first flowing through the collector or mesh structure 2 and then through the filter 22. The filter 22 has a shorter useful life than the collector. The internal heater 6, the external heating-mantle 6a or the flame from gas cylinder 47 will heat the water within housing or cartridge 1. Bicarbonate hardness of the water will be broken down and carbonates will be deposited on the collector or mesh structure 2 thereby gradually reducing its proper functioning. A condition of the filter 22 will change as a function of the depositing of the bicarbonates on the mesh structure 2 such that the filter 22 will monitor the condition of the filter. The filter 22 will become completely blocked before the mesh structure 2 to thereby stop the flow of water. This blocked filter 22 will therefore signal the need for maintenance of the collector or mesh structure 2. Because the flow of water will terminate, a user will be forced to replace a spent cartridge 1.

The apparatus and method of the present invention required little control, are simple to maintain and operate and are relatively inexpensive. In particular, the disposable cartridge 1 is relatively simple and the non-disposable contents of the apparatus require little maintenance. Therefore, the apparatus can economically treat water without entailing high capital expenditures.

The present apparatus and method reduce water hardness and provide sterile water while removing many impurities of the water. A simple method for in-home or in-store removal of microbiological contaminants, bicarbonate hardness, VOCs/THMs, chlorine, heavy metals and deaeration of water is provided. High reliability in the absence of technical monitoring or controls is obtained. This apparatus and method are simple, convenient and can safely be operated by non-qualified personnel. Moreover, this apparatus and method require only limited space thereby further reducing the overall cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed:

1. A water treatment apparatus comprising: an enclosure;
 a housing defining a water treatment chamber, the water treatment chamber being a cartridge which is readily removable from the enclosure;
 an inlet connected to the housing for introducing water into the water treatment chamber;
 treatment means comprising filter means for filtering the water within the housing;
 an outlet connected to the housing for accommodating flow of treated water from the water treatment chamber;

a storage tank connected to the water outlet for receiving water from the housing; and an area within the housing having a vented head-space for collecting gases released from the water, the outlet being directly connected to the area with the head-space such that water treated by said treatment means travels from the area of the housing with the head-space to the storage tank without filtering of the water by the filter means.

2. The water treatment apparatus of claim 1, further including:

heater means for heating water within the water treatment chamber in order to breakdown and precipitate certain solids from the water; and collector means disposed within the water treatment chamber through which water is flowable as the water moves between the inlet and the outlet, said collector means collecting the certain precipitated solids.

3. The water treatment apparatus as recited in claim 2, further comprising:

a collapsible water chamber within the storage tank, the collapsible water chamber including a movable hermetic barrier contacting water stored in the water chamber and following chances in water volume for keeping the water in the storage tank out of contact with head-space gases therein; and an air cushion within the storage tank, the air cushion exerting variable pressure on the movable barrier dependent on a quantity of stored water in the tank, pressure of the air cushion increasing and decreasing as the quantity of stored water increases and decreases to thereby control flow of water into the storage tank when pressure of the air cushion equals pressure from the stored water.

4. The water treatment apparatus as recited in claim 2, further comprising:

a movable actuator and a collapsible water chamber in the storage tank the collapsible water chamber including a movable hermetic barrier contacting water stored in the water chamber and following changes in water volume for keeping the water in the storage tank out of contact with head-space gases therein; and flow control means for controlling flow of water into the storage tank, the flow control means including a level switch at least partially located within the storage tank, the actuator being in contact with and being moved by the movable barrier, the barrier being moved by introduction and removal of water in the storage tank such that when a capacity of the storage tank is at a maximum, the actuator is moved by the barrier to engage the level switch to thereby terminate flow of water into the storage tank.

5. The water treatment apparatus as recited in claim 2, wherein the filter means is located downstream from the collector means and receives some of the certain precipitated solids, the filter means becoming blocked when the collector means is in need of maintenance, the collector means being sufficiently open to permit flow of water therethrough when the filter means is blocked but the blocked filter means preventing the flow of water through the collector means thereby signalling the need for maintenance of the collector means.

6. The water treatment apparatus as recited in claim 5, wherein the water treatment chamber is substantially free of chemicals for treating water quality, the heater means, the filter means, the area for collecting gasses and the collector means being primarily responsible for water quality treatment within the water treatment chamber.

7. The water treatment apparatus as recited in claim 2, wherein the head-space is at an upper end of the water treatment chamber, gases disentrained from water in the water treatment chamber being caught in the head-space, the water treatment apparatus further comprising:

a vent connected to the head-space for venting gases therefrom;

a valve in the water outlet; and a thermal switch connected to the vent, the thermal switch sensing temperature within the water treatment chamber, the thermal switch closing the valve in the outlet when temperature in the water treatment chamber is below a predetermined temperature to thereby stop flow of water from the water treatment chamber.

8. The water treatment apparatus as recited in claim 2, wherein the collector means is a mesh structure and wherein the head-space is at an upper end of the water treatment chamber, gases disentrained from the water in the water treatment chamber being caught in the head-space, the water treatment chamber further comprises a removable head located at the upper end of the water treatment chamber, the head-space being located between the head and the mesh structure.

9. The water treatment apparatus as recited in claim 2, wherein the water treatment chamber has an annular shape with a central opening, the heater means being insertable into the central opening of the water treatment chamber.

10. The water treatment apparatus as recited in claim 2, wherein the heater means surrounds at least a part of the water treatment chamber.

11. The water treatment apparatus as recited in claim 2, wherein the heater means comprises a gas cylinder, the water treatment chamber having an internal chimney with the gas cylinder being located therebelow.

12. The water treatment apparatus as recited in claim 2, further comprising a plurality of baffles within the collector means, the baffles forcing the water to flow over a tortuous path through the collector means.

13. The water treatment apparatus as recited in claim 2, further comprising:

a heat exchanger, the water inlet and water outlet passing through the heat exchanger such that heated water exiting the water treatment chamber in the water outlet heats incoming water in the water inlet; and an air-cooler in the water outlet, the water outlet passing water through the air-cooler before the water enters the heat exchanger to thereby reduce temperature thereof and ensure that incoming water fails to be heated in the heat exchanger to a degree which would induce premature precipitation of dissolved solids in the incoming water.

14. The water treatment apparatus of claim 2, further comprising control means for controlling treatment time of water in the water treatment chamber and wherein water treated by said treatment means travels from the area of the housing with the head-space to the storage tank without further additional filtering of the water.

15. The water treatment apparatus as recited in claim 1, further comprising an air cushion in the storage tank for providing a back-pressure on the water treatment chamber.

16. The water treatment apparatus as recited in claim 1, further comprising a dispenser connected to the storage tank, the dispenser being substantially free of chemicals for cleaning water.

17. The water treatment apparatus of claim 1, further including a collapsible water chamber in the storage tank, the collapsible water chamber including a movable hermetic barrier contacting water stored in the water chamber and following changes in water volume for keeping the water in the storage tank out of contact with head-space gases therein.

18. The water treatment apparatus as recited in claim 17, further comprising an air cushion within the storage tank, the air cushion exerting variable pressure on the movable barrier dependent on a quantity of stored water in the tank, pressure of the air cushion increasing and decreasing as the quantity of stored water increases and decreases to thereby control flow of water into the storage tank when pressure of the air cushion equals pressure from the stored water.

19. The water treatment apparatus as recited in claim 18, further comprising:

heater means for heating water within the water treatment chamber in order to breakdown and precipitate certain solids from the water;

a valve in the outlet from the housing, the valve being opened and closed to control flow of water from the water treatment chamber to the storage tank;

a pressure switch for sensing the pressure of the air cushion, the pressure switch being operatively connected to the valve in the outlet and being operatively connected to the heater means, the pressure switch turning the heater means off when the storage tank is full and further turning the heater means on when water is discharged from the full storage tank; and a thermal switch for sensing temperature within the treatment chamber, the pressure switch turning the heater means on when water is withdrawn from a full storage tank and the thermal switch delaying opening of the valve in the outlet until a predetermined temperature is reached within the water treatment chamber whereby water at a predetermined temperature is discharged from the water treatment chamber.

20. The water treatment apparatus as recited in claim 17, further comprising a movable actuator in the storage tank and flow control means for controlling flow of water into the storage tank, the flow control means including a level switch at least partially located within the storage tank, the actuator being in contact with and being moved by the movable barrier, the barrier being moved by introduction and removal of water in the storage tank such that when a capacity of the storage tank is at a maximum, the actuator is moved by the barrier to engage the level switch to thereby terminate flow of water into the storage tank.

21. The water treatment apparatus as recited in claim 20, further comprising:

a thermal switch for sensing temperature within the water treatment chamber;

heater means for heating water within the water treatment chamber in order to breakdown and precipitate certain solids from the water; and a valve in the outlet from the housing, the valve being opened and closed to control flow of water from the water treatment chamber to the storage tank, the level switch being operatively connected to the valve in the outlet and being operatively connected to the heater means, the level switch turning the heater means off when the storage tank is full, the level switch further turning the heater means on when water is discharged from the full storage tank, the thermal switch delaying opening of the valve in the outlet until a predetermined temperature is reached in the water treatment chamber whereby water at a predetermined temperature is discharged from the water treatment chamber.

22. The water treatment apparatus as recited in claim 17, wherein the movable barrier is a flexible membrane.

23. The water treatment apparatus of claim 1, wherein the area with the head-space and the means for filtering are generally linearly aligned within the housing.

24. A water treatment apparatus comprising:

a housing defining a water treatment chamber;

an inlet connected to the housing for introducing water into the water treatment chamber;

an outlet connected to the housing for accommodating flow of treated water from the water treatment chamber;

control means for controlling treatment time of water in the water treatment chamber;

heater means for heating water in the water treatment chamber;

a storage tank connected to the water outlet for receiving water from the housing;

a collapsible water chamber in the storage tank, the collapsible water chamber including a movable hermetic barrier contacting water stored in the water chamber and following changes in water volume for keeping the water in the storage tank out of contact with head-space gases therein;

a movable actuator in the storage tank and flow control means for controlling flow of water into the storage tank, the flow control means including a level switch at least partially located within the storage tank, the actuator being in contact with and being moved by the movable barrier, the barrier being moved by introduction and removal of water in the storage tank such that when a capacity of the storage tank is at a maximum, the actuator is moved by the barrier to engage the level switch to thereby terminate flow of water into the storage tank; and a thermal switch for sensing temperature within the water treatment chamber and a valve in the outlet from the housing, the valve being opened and closed to control flow of water from the water treatment chamber to the storage tank, the level switch being operatively connected to the valve in the outlet and being operatively connected to the heater means, the level switch turning the heater means off when the storage tank is full, the level switch further turning the heater means on when water is discharged from the full storage tank, the thermal switch delaying opening of the valve in the outlet until a predetermined temperature is reached in the water treatment chamber whereby water at a predetermined temperature is discharged from the water treatment chamber.

* * * * *